G. M. MERWIN.
FODDER DISINTEGRATOR.
APPLICATION FILED NOV. 26, 1920.
Reissued Feb. 22, 1921. 15,050.
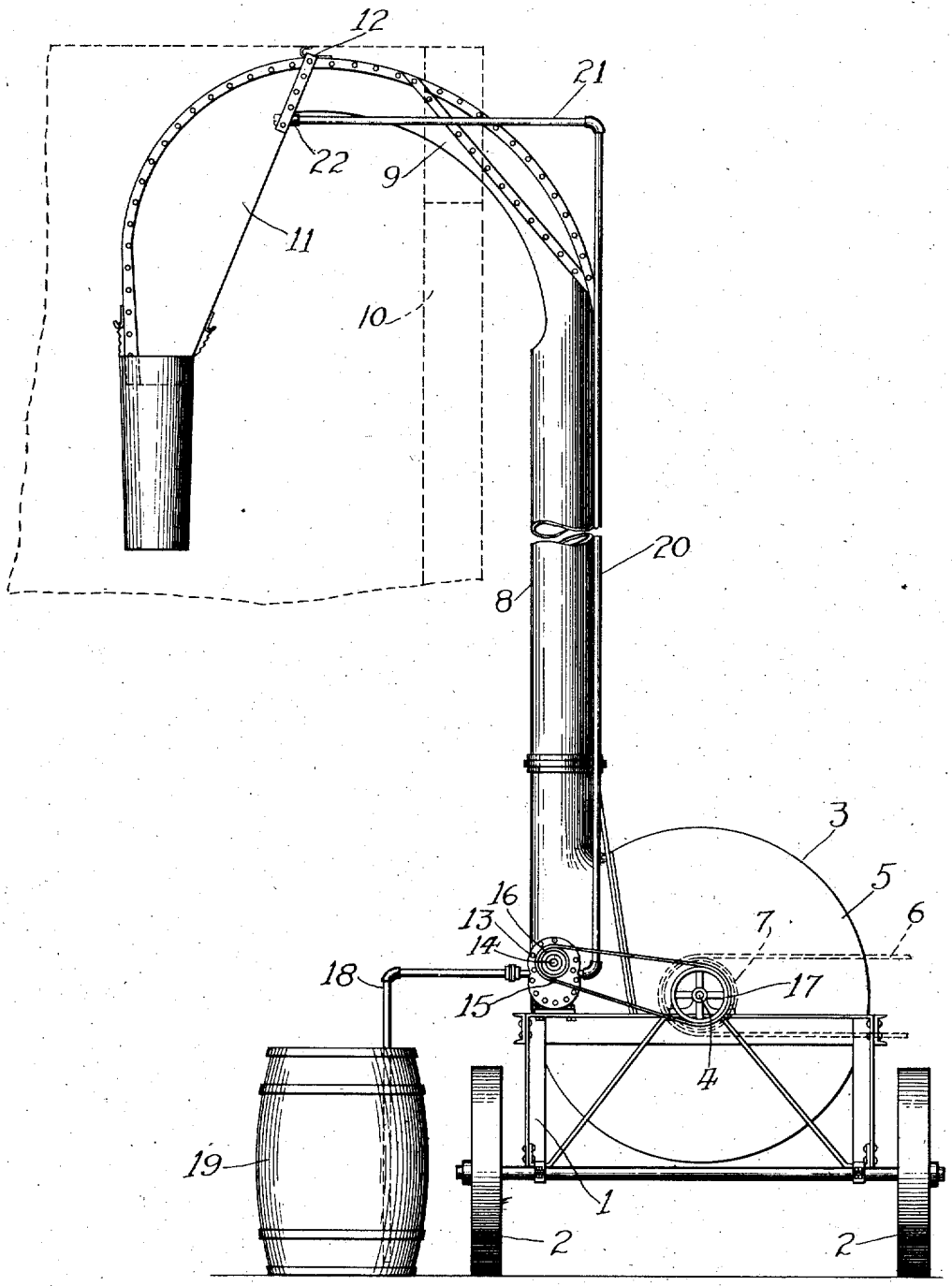
Inventor:
George M. Merwin,
By H. P. Doolittle
Atty.

UNITED STATES PATENT OFFICE.

GEORGE M. MERWIN, OF BERWYN, ILLINOIS, ASSIGNOR, BY MESNE ASSIGNMENTS, TO INTERNATIONAL HARVESTER COMPANY, A CORPORATION OF NEW JERSEY.

FODDER-DISINTEGRATOR.

15,050. Specification of Reissued Letters Patent. Reissued Feb. 22, 1921.

Original No. 1,303,352, dated May 13, 1919, Serial No. 73,887, filed January 24, 1916. Application for reissue filed November 26, 1920. Serial No. 426,645.

*To all whom it may concern:*

Be it known that I, GEORGE M. MERWIN, a citizen of the United States, residing at Berwyn, in the county of Cook and State of Illinois, have invented certain new and useful Improvements in Fodder-Disintegrators, of which the following is a full, clear, and exact specification.

My invention relates to fodder disintegrators.

It has for its object to moisten ensilage in such an improved manner as to facilitate the moistening process, reduce the power required, and increase the life of the cutter. I attain these objects by supplying the moisture to the ensilage in an improved manner after the ensilage has been delivered from the fan casing and elevated to the top of the silo, preferably supplying the moisture thereto in a stream moving substantially in the direction of movement of the ensilage and acting upon the latter as the same is delivered to the silo.

In the accompanying drawing I have, for purposes of illustration, shown one embodiment which my invention may assume in practice.

The cutter shown may be of any standard construction, including a frame 1 mounted upon wheels 2 and carrying a combined cutter and fan head 3 on a shaft 4, this head 3 being inclosed in the usual fan casing 5.

In the construction shown the shaft 4 is driven by a belt 6 connected to any suitable source of power and extending around a pulley 7 on one end of the shaft. As usual, the ensilage cut by the head 3 is blown by the blast developed thereby up through the delivery means, which comprises the vertical pipe 8 and distributer 11. The upper end of the pipe 8 is curved laterally and formed into an open throated delivery member 9 which extends over the silo wall 10, or through an opening therein, and carries the distributer 11 pivotally connected thereto at 12. The distributer is movable about the pivotal connection to distribute the ensilage within the silo in a well known manner.

In my improved construction a pump 13 of any desired form, and preferably of the rotary type, is mounted upon the frame 1 of the ensilage cutter at a point to one side of the shaft 4 and preferably substantially in line with the pipe 8. This pump is provided with a rotating member or shaft 14 which may be driven from the ensilage cutter in any suitable manner or by any other source of power, the member 14, for instance, being shown herein as driven by means of a belt 15 passing over pulleys 16 and 17 mounted on the shafts 14 and 4 respectively. The inlet of this pump is shown herein in the form of a laterally and downwardly extending pipe 18 which extends into any suitable source of liquid supply 19, while the outlet thereof assumes the form of a pipe 20 extending upward to a point substantially opposite the top of the delivery member 9, where it is extended laterally, as shown at 21, and protruding preferably into the distributer, where, if desired, a suitable delivery nozzle 22 may be placed on the pipe.

It will be noted that in my improved construction there is no flooding of the casing 5, as has heretofore been the case, that no water may find its way into the casing, that the power requirements are relatively small, that the life of the machine is increased by the elimination of the water in the casing, and that the moisture is applied to the ensilage in such a manner as to thoroughly distribute it among the particles of ensilage without in any way interfering with the delivery movement of the latter, but, instead, assisting in the delivery operation. These and other advantages of my improved construction will be apparent to those skilled in the art.

While I have in this application specifically described one embodiment of my invention, it is to be understood that I do not limit myself thereto and that I contemplate covering all modifications of the invention embodying the spirit of the same within the scope of the appended claims.

What I claim as new is:

1. In a fodder disintegrating and delivering machine, ensilage cutting and delivering mechanism including means for delivering the fodder in a continuous stream, an upwardly extending delivery member, a downwardly extending distributer connected thereto and receiving material therefrom, means for supplying moisture to the moving stream of fodder as it passes through said distributer, and common operating means for said moisture supplying means and said ensilage cutting mechanism.

2. In an ensilage cutting and delivering machine, fodder disintegrating and delivering mechanism including a delivery pipe having an open sided delivery end, a distributer receiving material from said pipe, means for supplying liquid to the disintegrated fodder after it leaves the delivery pipe and common operating means for said fodder disintegrating mechanism and said means for supplying liquid.

3. In a fodder disintegrating and distributing machine, cutting and delivering mechanisms including delivery and distributing members, a pump with a delivery pipe leading into said distributing member for supplying moisture to the fodder, and a common operating means for said cutting mechanism and said pump.

4. In a fodder disintegrating and distributing machine, disintegrating mechanism having a discharge outlet, delivery means connected to the outlet and adapted to deliver the disintegrated fodder at a point of discharge, means for supplying water to the fodder between the discharge outlet and point of discharge, and a common operating means for said disintegrating mechanism and said water supplying means.

5. In a fodder disintegrating and distributing machine, cutting and blowing mechanism, delivery means leading from the blowing mechanism to a point of discharge, and means for supplying water to the disintegrated fodder between the blower and point of discharge.

6. In a fodder disintegrating and distributing machine, the combination of cutting and blowing mechanism, delivery means adapted to receive the fodder from the blower and discharge it into a silo, a pump, a delivery pipe leading from the pump to the delivery means to supply water to the disintegrated fodder, and common driving means for the cutting and blowing mechanism and pump.

In testimony whereof I affix my signature.

GEORGE M. MERWIN.